United States Patent
Hunzinger

(12)
(10) Patent No.: US 6,678,530 B1
(45) Date of Patent: Jan. 13, 2004

(54) DYNAMIC POWER CONTROL OF A CHANNEL SIGNAL

(75) Inventor: Jason F. Hunzinger, Carlsbad, CA (US)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/575,825

(22) Filed: May 18, 2000

(51) Int. Cl.[7] .................................................. H04Q 7/20
(52) U.S. Cl. ...................... 455/522; 455/226.1; 455/69; 455/67.11
(58) Field of Search ................................ 455/522, 67.1, 455/67.3, 69, 226.1, 226.2, 226.3, 67.11, 67.13

(56) References Cited

U.S. PATENT DOCUMENTS

| | | | | |
|---|---|---|---|---|
| 4,777,653 A | * | 10/1988 | Bonnerot et al. | 375/285 |
| 5,511,067 A | * | 4/1996 | Miller | 370/335 |
| 5,574,984 A | * | 11/1996 | Reed et al. | 455/504 |
| 5,845,212 A | * | 12/1998 | Tanaka | 455/437 |
| 5,982,760 A | * | 11/1999 | Chen | 370/335 |
| 6,069,883 A | * | 5/2000 | Ejzak et al. | 370/335 |
| 6,304,560 B1 | * | 10/2001 | Archambaud et al. | 370/324 |
| 6,421,357 B1 | * | 7/2002 | Hall | 341/60 |

* cited by examiner

*Primary Examiner*—Edward F. Urban
*Assistant Examiner*—Lana Le
(74) *Attorney, Agent, or Firm*—Harness, Dickey & Pierce, PLC

(57) ABSTRACT

A mobile station enhances the ability to complete a handoff by maintaining channels on the secondary base stations at low levels. The mobile station searches all active base stations to determine if a lock on the dedicated channel can be maintained. If a lock can be maintained, the mobile station provides feedback to the base station to adjust the power of the secondary channels. The power is adjusted so that the secondary channels are maintained at a low power level, typically a barely receivable level.

16 Claims, 3 Drawing Sheets

DYNAMIC POWER CONTROL OF A CHANNEL SIGNAL

TECHNICAL FIELD

This invention relates to wireless communication systems, and more particularly to signal power control within wireless communication systems.

BACKGROUND

Cellular telephones may operate under a variety of standards including the code division multiple access (CDMA) cellular telephone communication system as described in TIA/EIA, IS-95, Mobile station-Base Station Compatibility Standard for Dual-Mode Wideband Spread Spectrum Cellular System, published July 1993. CDMA is a technique for spread-spectrum multiple-access digital communications that creates channels through the use of unique code sequences. In CDMA systems, signals can be and are received in the presence of high levels of interference. The practical limit of signal reception depends on the channel conditions, but CDMA reception in the system described in the aforementioned IS-95 Standard can take place in the presence of interference that is 18 dB larger than the signal for a static channel. Typically, the system operates with a lower level of interference and dynamic channel conditions.

A mobile station using the CDMA standard constantly searches a Pilot Channel of neighboring base stations for a pilot that is sufficiently stronger than a threshold value. As the mobile station moves from the region covered by one base station to another, the mobile station promotes certain pilots from the Neighbor Set to the Candidate Set, and notifies the base station or base stations of the promotion from the Neighbor Set to the Candidate Set via a Pilot Strength Measurement Message. The base station determines an Active Set according to the Pilot Strength Measurement Message, and notifies the mobile station of the new Active Set via a Handoff Direction Message. When the mobile station commences communication with a new base station in the new Active Set before terminating communications with the old base station, a "soft handoff" has occurred.

One problem with a "soft handoff" is that RF resources are used inefficiently while mobile stations are in soft handoff. To solve this problem, some providers have proposed using fast cell selection mechanisms. However, such mechanisms have several problems, including an imbalance in the forward and reverse link, a selection feedback delay, and reduced reliability. What is desired is a system that includes the advantages of both the soft handoff and the fast cell selection mechanism while reducing the negative aspects of each system.

SUMMARY

The present invention enhances the ability of a mobile station to complete handoff by maintaining channels on the secondary base stations at low levels. The mobile station searches all active base stations to determine if a lock on the dedicated channel can be maintained. If a lock can be maintained, the mobile station provides feedback to the base station to adjust the power of the secondary channels. The power is adjusted so that the secondary channels are maintained at a low power level, typically a barely receivable level.

One aspect of the invention is a method of controlling power in a wireless communication system comprising detecting a signal and instructing the transmitter to reduce the signal power if the signal power exceeds a predetermined threshold. The method also comprises instructing the transmitter to increase the signal power if the signal power does not exceed the predetermined threshold. The threshold may be, among other things, a receive signal strength indicator (RSSI), a bit error rate, or a finger correlation of a null or preamble signal.

Another aspect of the invention is a method of controlling the power level of a channel comprising selecting a power measurement metric, comparing the metric to a threshold value, and adjusting the power level of the channel based on the comparison. The channel may include usable data or may include null data.

Another aspect of the invention is a mobile station for use in a wireless communication system. The mobile station comprises a signal detector and a power adjustment circuit. The power adjustment circuit provides instructions on a power setting based on the detected signal. The power setting instructions are provided via a closed-loop feedback channel.

DESCRIPTION OF DRAWINGS

These and other features and advantages of the invention will become more apparent upon reading the following detailed description and upon reference to the accompanying drawings.

DETAILED DESCRIPTION

Figure 1:
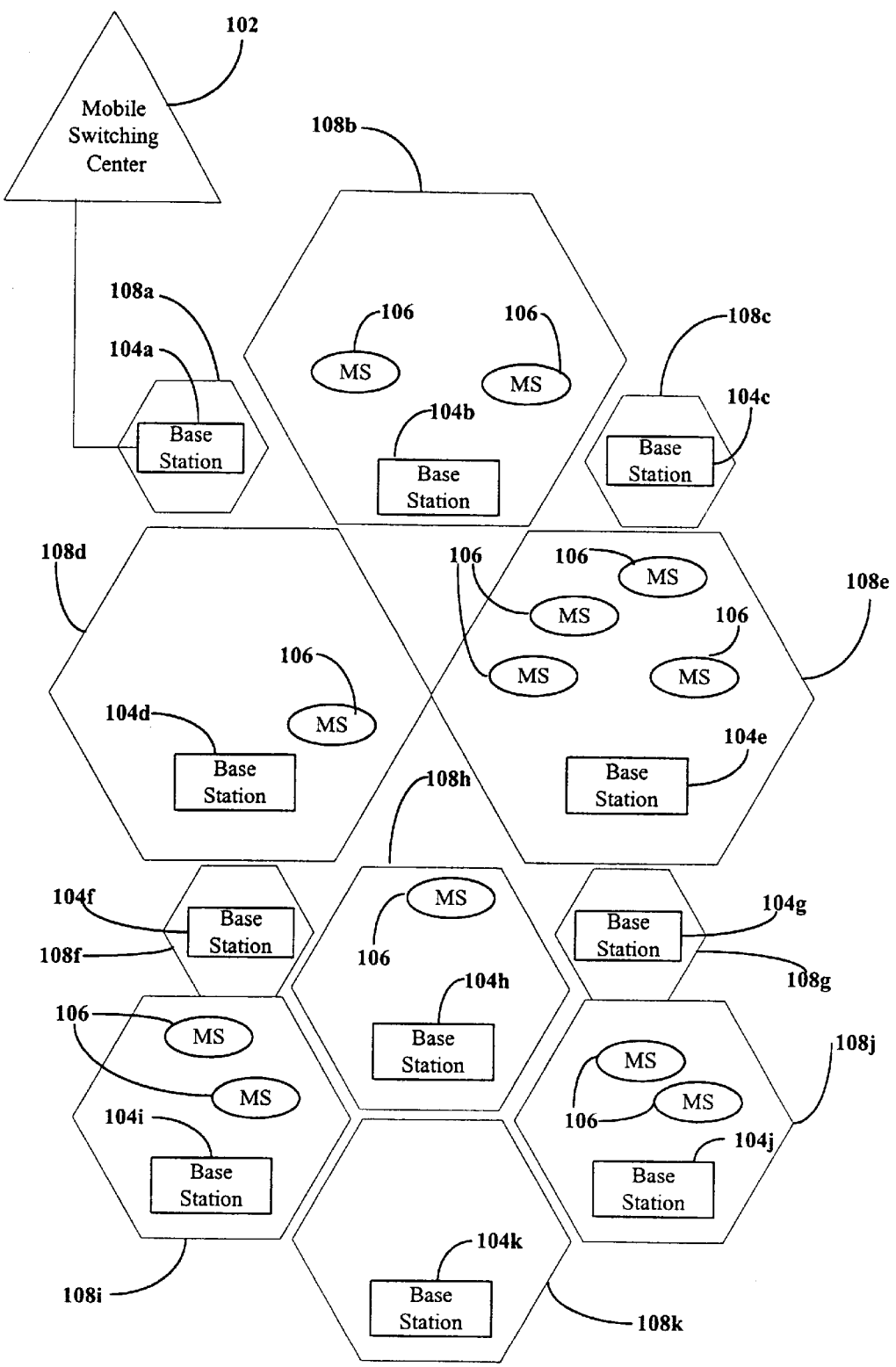
FIG. 1 illustrates the components of an exemplary wireless communication system used by one embodiment of the present invention.

FIG. 1 illustrates components of an exemplary wireless communication system. A mobile switching center 102 communicates with base stations 104a–104k (only one connection shown). The base stations 104a–104k (generally 104) broadcasts data to and receives data from mobile stations 106 within cells 108a–108k (generally 108). The cell 108 is a geographic region, roughly hexagonal, having a radius of up to 35 kilometers or possibly more.

A mobile station 106 is capable of receiving data from and transmitting data to a base station 104. In one embodiment, the mobile station 106 receives and transmits data according to the Code Division Multiple Access (CDMA) standard. CDMA is a communication standard permitting mobile users of wireless communication devices to exchange data over a telephone system wherein radio signals carry data to and from the wireless devices.

Under the CDMA standard, additional cells 108a, 108c, 108d, and 108e adjacent to the cell 108b permit mobile stations 106 to cross cell boundaries without interrupting communications. This is so because base stations 104a, 104c, 104d, and 104e in adjacent cells assume the task of transmitting and receiving data for the mobile stations 106. The mobile switching center 102 coordinates all communication to and from mobile stations 106 in a multi-cell region. Thus, the mobile switching center 102 may communicate with many base stations 104.

Mobile stations 106 may move about freely within the cell 108 while communicating either voice or data. Mobile stations 106 not in active communication with other telephone system users may, nevertheless, scan base station 104 transmissions in the cell 108 to detect any telephone calls or paging messages directed to the mobile station 106.

One example of such a mobile station 106 is a cellular telephone used by a pedestrian who, expecting a telephone call, powers on the cellular telephone while walking in the cell 108. The cellular telephone scans certain frequencies (frequencies known to be used by CDMA) to synchronize communication with the base station 104. The cellular telephone then registers with the mobile switching center 102 to make itself known as an active user within the CDMA network.

When detecting a call, the cellular telephone scans data frames broadcast by the base station 104 to detect any telephone calls or paging messages directed to the cellular telephone. In this call detection mode, the cellular telephone receives, stores and examines paging message data, and determines whether the data contains a mobile station identifier matching an identifier of the cellular telephone. If a match is detected, the cellular telephone establishes a call with the mobile switching center 102 via the base station 104. If no match is detected, the cellular telephone enters an idle state for a predetermined period of time, then exits the idle state to receive another transmission of paging message data.

Figure 2:
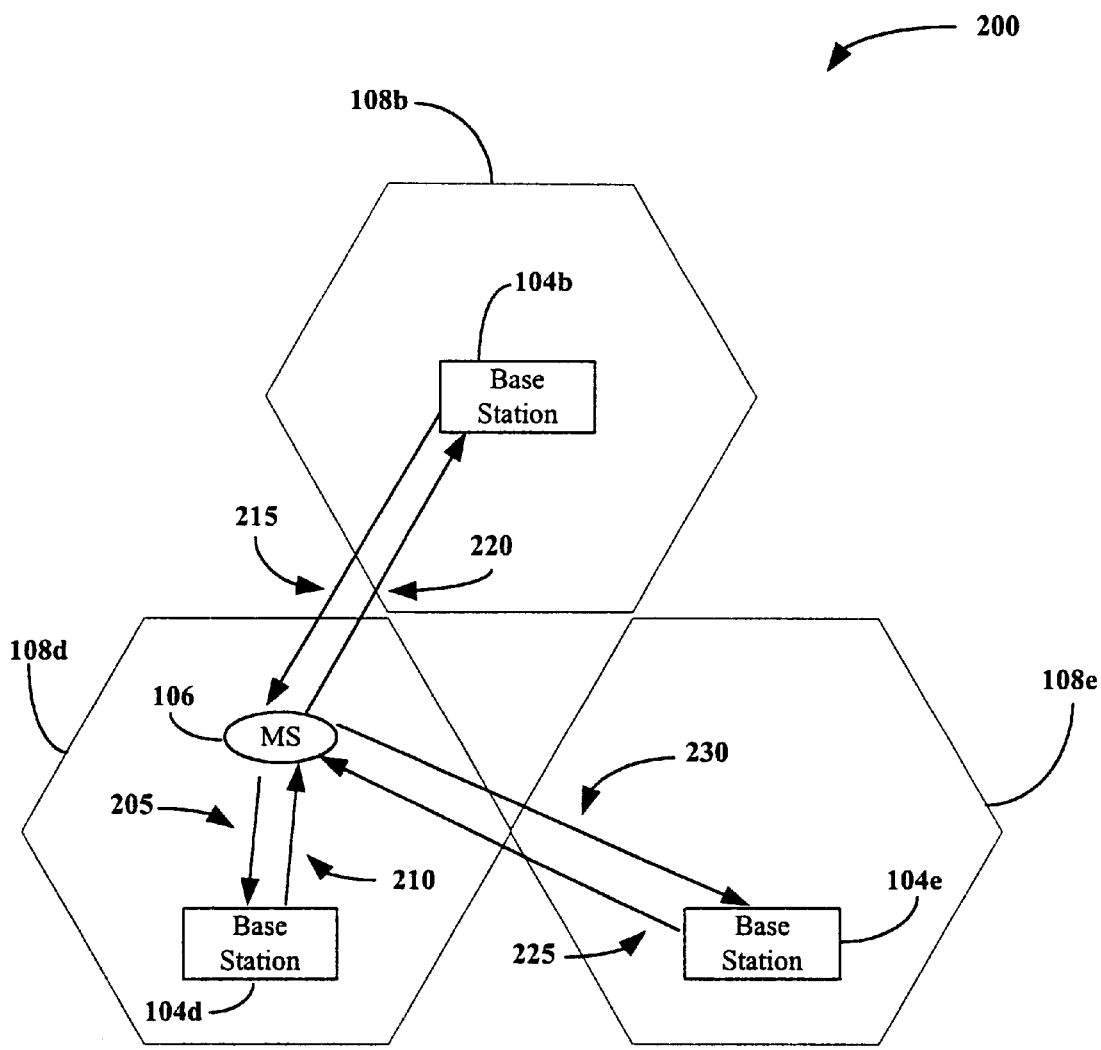
FIG. 2 illustrates a mobile station in communication with a primary sector and secondary sectors according to one embodiment of the present invention.

FIG. 2 illustrates a mobile station in communication with a primary sector and secondary sectors according to one embodiment of the present invention. For purposes of illustration, FIG. 2 only shows a portion of the wireless communication system of FIG. 1 comprising an active set 200 of base stations 104*b*, 104*d*, and 104*e*. The active set 200 includes the information necessary for the mobile station 106 to maintain a call. Each of the base stations 104*b*, 104*d*, and 104*e* in the active set 200 transmits to the mobile station 106 on a forward dedicated channel 210, 215, and 225. The mobile station 106 communicates back to the base stations 104*b*, 104*d*, and 104*e* over closed-loop feedback channels 205, 220, and 230. The forward channels 210, 215, and 225 and the closed-loop feedback channels 205, 220, and 230 may be any channel used in the wireless cellular system. These include, but are not limited to, the TCH, the DCCH, the SCH, and the SCCH as per IS2000-A.

At any time, one of the base stations 104*b*, 104*d*, and 104*e* is selected as the active or primary station and the remaining base stations are the secondary stations. The primary station is used for demodulation and the secondary stations in the active set 200 are maintained in case the mobile station 106 needs to change the primary station. The primary station transmits the dedicated channel 210, 215, or 225 at a power level designed to enable demodulation with the mobile station 106. The power level may be full power or may be power controlled. The secondary stations transmissions over the dedicated channel 210, 215, or 225 are power controlled by the mobile station 106 via the closed-loop feedback channels 205, 220, and 230. The secondary stations may transmit the same data that is being sent by the primary stations, or may transmit null or preamble data. If the mobile station 106 desires to change primary stations, the mobile station 106 may send a coded message on the closed-loop feedback channels 205, 220, and 230. The mobile station 106 may simply power down the current primary station and power up the new primary station.

Figure 3:
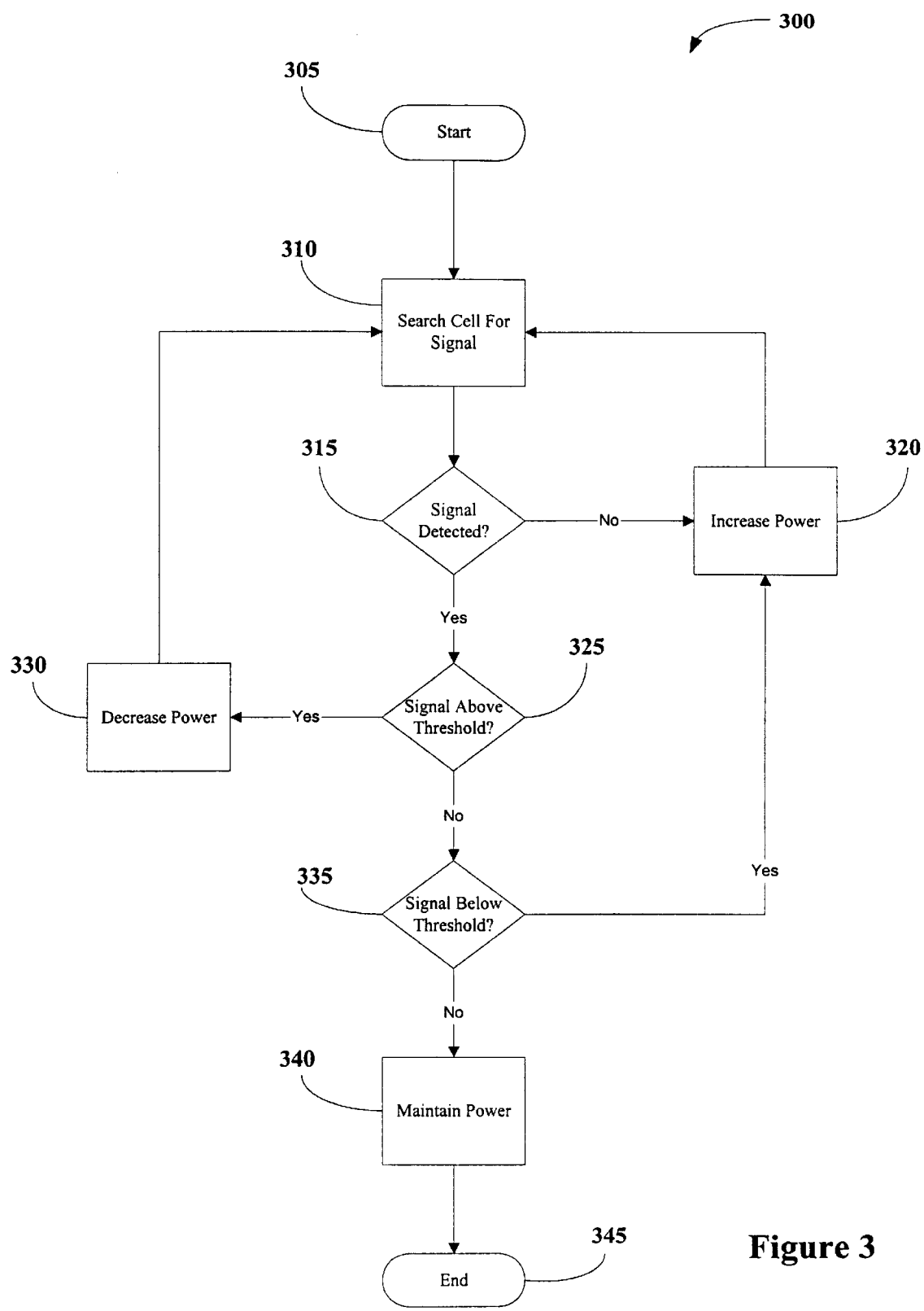
FIG. 3 is a flowchart illustrating the power adjustment process used by the mobile station according to one embodiment of the present invention.

FIG. 3 is a flowchart illustrating a cycle of the power adjustment process 300 used by the mobile station 106. The process 300 begins at a START state 305. Proceeding to state 310, the mobile station 106 searches each of the active cells for a signal. The mobile station 106 searches for the desired channel, which may be the TCH (traffic channel), the DCCH (dedicated control channel), the SCH (synchronization channel), and the SCCH (specific cell channel). The signal may be transmitting data, or if a secondary station, may transmit null or preamble information instead of data.

Proceeding to state 315, the mobile station 106 determines if the signal is detected. If there is no signal detected, then the base station 104 that is supplying the signal may be transmitting at a power level that is too low for the mobile station 106 to receive. In this case, the mobile station 106 proceeds along the NO branch to state 320. In state 320, the mobile station instructs the appropriate base station 104 to increase power. This instruction may be transmitted via the closed-loop feedback channels 205, 220, and 230. After receiving the instruction to increase power, the base station retransmits the signal at a higher power level. The mobile station 106 then returns to state 310 to again search for the signal. The mobile station 106 remains in this loop until the power level is high enough to detect.

Returning to state 315, if the signal is detected, the mobile station 106 proceeds along the YES branch to state 325. In state 325, the mobile station 106 determines if the signal power is above a specific threshold. The mobile station 106 uses a variety of indicators to determine signal power. Among these indicators is a bit error rate, a symbol error rate, a frame error rate, a receiver quality indicator (RX Quality), a receive signal strength indicator (RSSI), also known as RX Level, determining the period of time of a finger lock is maintained, or having the finger correlation of a null/preamble signal above a certain threshold. The mobile station 106 uses these indicators to determine the signal quality.

In particular, the bit error rate is the number of erroneous bits in a data transmission. The RX Quality is a value assigned by the network indicating the quality of the received signal based upon the bit error rate. The RX Quality figure provides a mobile station 106 with an expected measurement accuracy. The mobile station 106 uses the RX Quality to determine the overall potential for error.

Another measurement that may be used by the mobile station 106 is RSSI. RSSI provides a known value based upon the measured strength of the signal at the mobile station 106. A stronger signal at the mobile station 106 indicates less likelihood for error. Table 2 provides sample values for RSSI based upon the signal strength at the mobile station 106. Each specific value for RSSI correlates to the strength of the signal (in measured decibels (dBm)) at the mobile station 106 reciever.

TABLE 2

| RSSI | Level at Receiver (dBm) |
|---|---|
| 0 | Less than −110 |
| 1 | −110 to −109 |
| 2 | −109 to −108 |
| ... | ... |
| ... | ... |
| ... | ... |
| 62 | −49 to −48 |
| 63 | above −48 |

The precise threshold value may be preset in the mobile station 106 or may be adjusted based on historical data. If the signal is above the selected threshold (i.e. RSSI bit error rate), than the mobile station proceeds along the YES state 330. In state 330, the mobile station instructs the appropriate base station 104 to decrease power. This instruction may be transmitted via the closed-loop feedback channels 205, 220, and 230. After receiving the instruction to decrease power, the base station retransmits the signal at a lower power level. The mobile station 106 then returns to state 310 to again search for the signal.

Returning to state 325, if the signal is not above the selected threshold, the mobile station 106 proceeds along the NO branch to state 335. In state 335, the mobile station 106 determines if the signal power is below a specific threshold. The mobile station 106 may use the same threshold for the power adjustment as was used by the mobile station 106 in state 325, or may use a separate threshold for determining low power. If the signal is below the threshold, the mobile station 106 proceeds along the YES branch to state 320. In state 320, the mobile station instructs the appropriate base station 104 to increase power. This instruction may be transmitted via the closed-loop feedback channels 205, 220, and 230. After receiving the instruction to increase power, the base station retransmits the signal at a higher power level. The mobile station 106 then returns to state 310 to again search for the signal.

Returning to state 335, if the signal power is not below the threshold, the mobile station proceeds along the NO branch to state 340. In state 340, the mobile station has determined the power is set at a barely receivable level and maintains this power level. The mobile station 106 may send a signal to the base station 104 indicating the desire to maintain the power level, or may not send any signal to the base station 104. In absence of instructions from the mobile station 106, the base station 104 may maintain the last power level. Of course, depending on the threshold selected, the signal may be maintained at an unusable level as opposed to the barely receivable level. The precise level to maintain the power may be set by selecting the appropriate power metric and threshold. After indicating the power level is to be maintained, the mobile station 106 proceeds to an END state 345.

Numerous variations and modifications of the invention will become readily apparent to those skilled in the art. Accordingly, the invention may be embodied in other specific forms without departing from its spirit or essential characteristics.

What is claimed is:

1. A method of controlling forward-link power of a secondary base station in a wireless communication system, comprising:

detecting a signal transmitted from the secondary base station at a mobile station;

instructing the secondary base station to reduce the signal power when the signal power exceeds a predetermined threshold, wherein the predetermined threshold is set to a power level selected from the group consisting of a barely usable power level and an unusable power level; and instructing the secondary base station to increase the signal power when the signal power does not exceed the predetermined threshold.

2. The method of claim 1, wherein the threshold is receive signal strength indicator (RSSI).

3. The method of claim 1, wherein the threshold is bit error rate.

4. The method of claim 1, wherein the threshold is frame error rate.

5. The method of claim 1, wherein the threshold is symbol error rate.

6. The method of claim 1, wherein the threshold is finger correlation of a null or preamble signal.

7. The method of claim 1, wherein the signal is a dedicated channel.

8. The method of claim 7, wherein the channel is the TCH channel.

9. The method of claim 7, wherein the channel is the DCCH channel.

10. The method of claim 7, wherein the channel is the SCH channel.

11. The method of claim 7, wherein the channel is the SCCH channel.

12. The method of claim 1, further comprising instructing the transmitter to increase the signal power if the signal is not detected.

13. A mobile station for use in a wireless communication system, comprising:

a signal detector operable to detect a signal transmitted from a secondary base station residing in the wireless communication system; and a power adjustment circuit which provides instructions on a power setting for a forward-link channel of the secondary base station based on the detected signal, wherein the power setting is selected from the group consisting of a barely usable power level and an unusable power level.

14. The mobile station of claim 13, wherein the power adjustment circuit compares the measured signal to a predetermined threshold to determine the power setting instructions.

15. The mobile station of claim 13, wherein the power setting instructions direct an increase in power when the measured signal is below the predetermined threshold.

16. The mobile station of claim 13, wherein the power setting instructions direct a decrease in power when the measured signal is above the predetermined threshold.

* * * * *